April 7, 1936.   J. P. FREEMON   2,036,523
COMBINATION COOKER
Filed Sept. 4, 1934   4 Sheets-Sheet 1
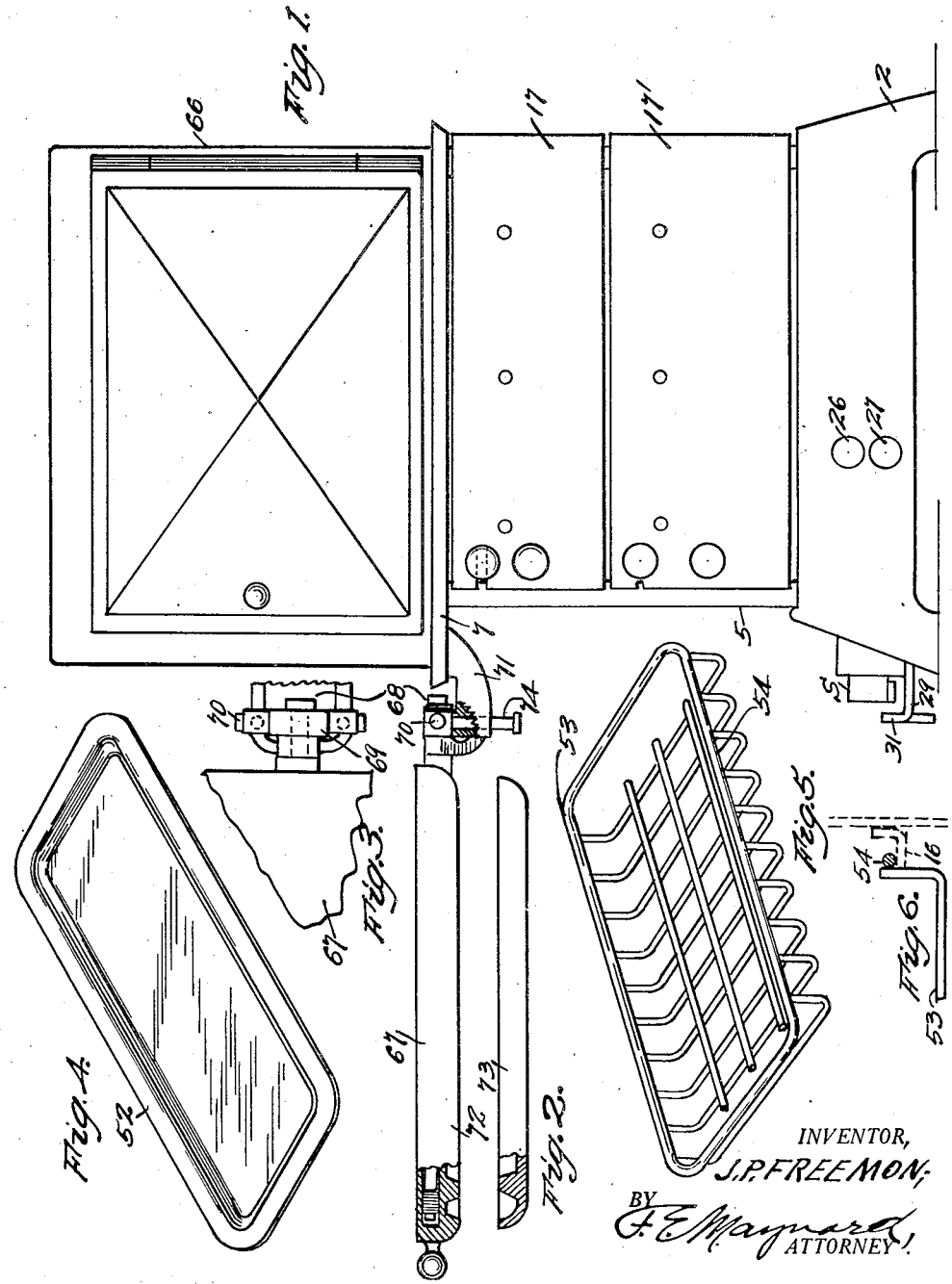
INVENTOR,
J. P. FREEMON;
BY
F. E. Maynard
ATTORNEY

INVENTOR,
J. P. FREEMON;
BY
ATTORNEY.

April 7, 1936. J. P. FREEMON 2,036,523
COMBINATION COOKER
Filed Sept. 4, 1934 4 Sheets-Sheet 3
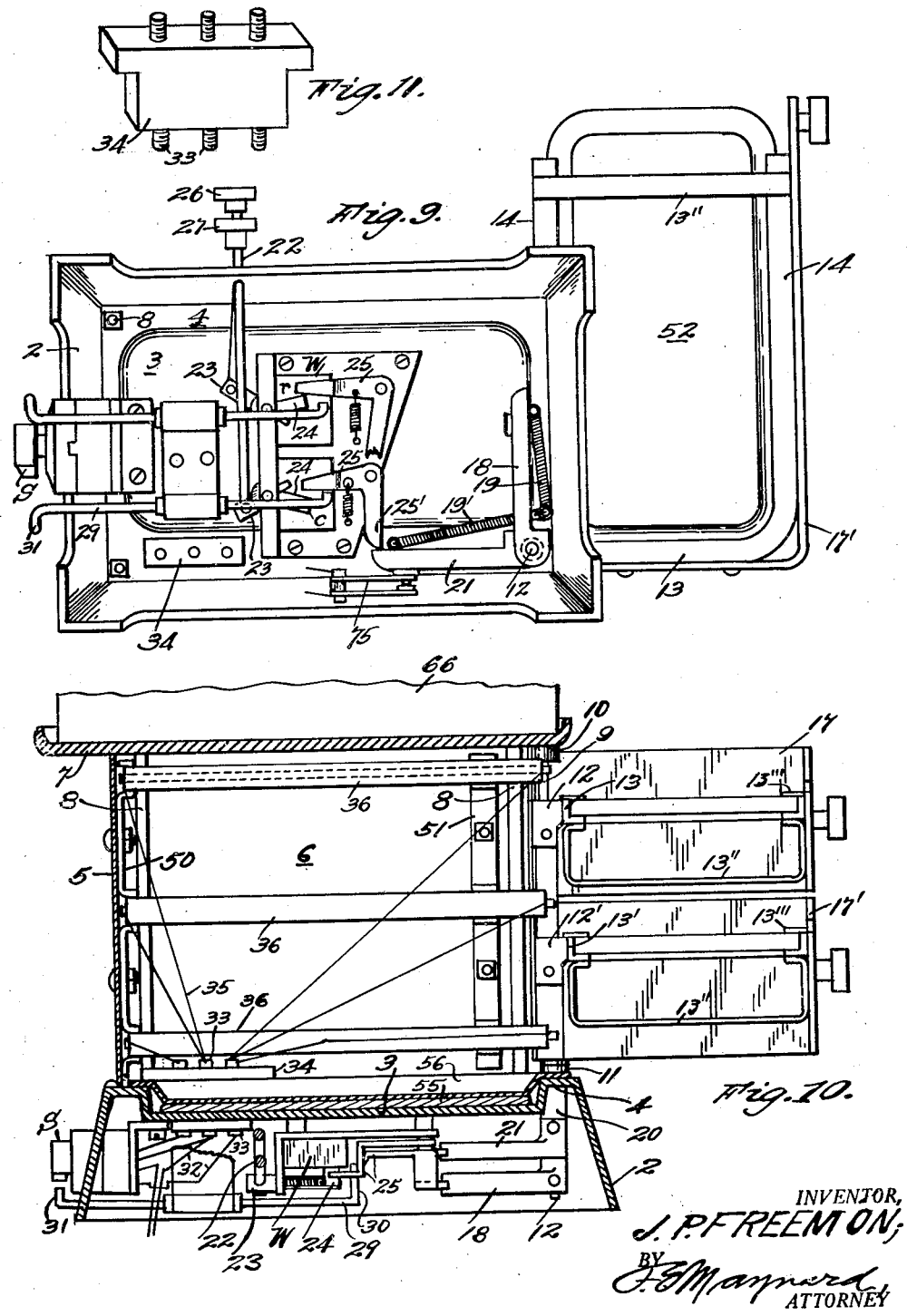
INVENTOR,
J. P. FREEMON,
BY
J. E. Maynard
ATTORNEY April 7, 1936. J. P. FREEMON 2,036,523
COMBINATION COOKER
Filed Sept. 4, 1934 4 Sheets-Sheet 4
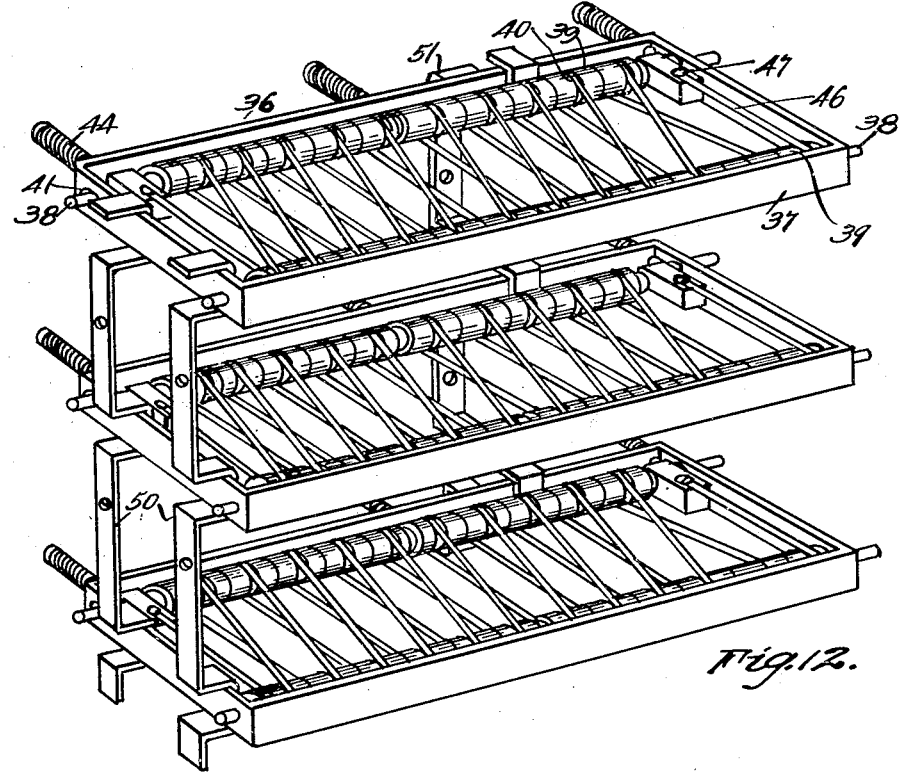
Fig. 12.
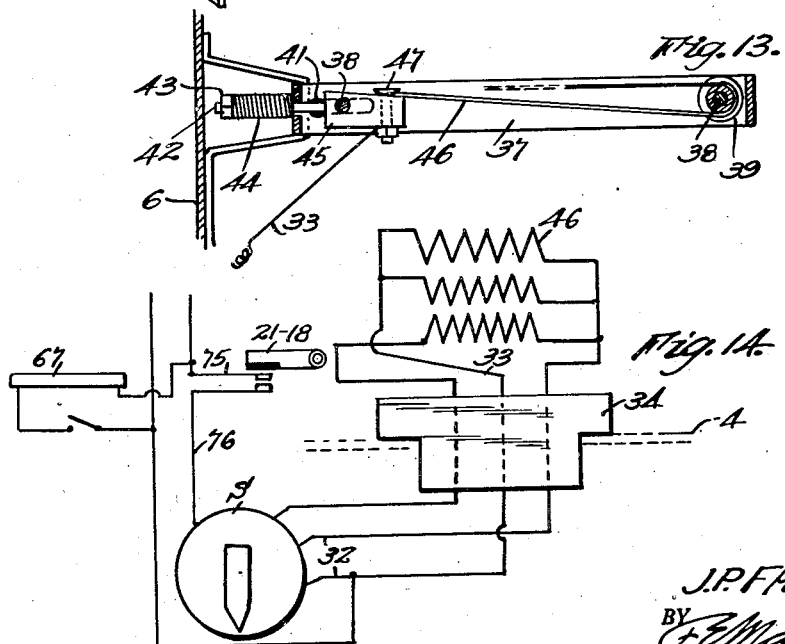
Fig. 13.
Fig. 14.
INVENTOR,
J. P. FREEMON;
BY
ATTORNEY.

Patented Apr. 7, 1936

2,036,523

UNITED STATES PATENT OFFICE 2,036,523

COMBINATION COOKER

John P. Freemon, San Francisco, Calif.

Application September 4, 1934, Serial No. 742,539

19 Claims. (Cl. 53—5)

This invention relates to automatic, electric cookers and one of the general objects of the invention is to provide a very compact structure incorporating a multiplicity of features forming together a highly practical combination cooker.

Another particular object of the invention is to provide an electric heating element characterized by features of construction whose purpose is to greatly increase the service life of the resistance filament of the element. And, in this connection, it is an object to provide for the facile renewal of the filament when it is ultimately burnt out or broken.

A purpose of the invention is to provide a single apparatus in which there is arranged a plurality of heater elements that may at one and the same time be used for the concurrent cooking of two or more servings of food of like or of different kinds with a resultant economy of electric current consumption.

A distinctive object of the invention is to provide for the relative movement of the heating element and a food holder in such a manner that the food is removed laterally from the vertical confines of the sides of the heater so as not to be further effected by heat ascending from the hot element. Further, an object is to provide a cooker in which there is a series of independent heater elements disposed horizontally and spaced vertically so that a cooker pan, basket or waffle-iron may be interposed between contiguous elements of a vertical pair; that is a vertically spaced pair.

An additional object is to provide a cooker of this class which is designed to be readily kept in a clean and sanitary condition, and in which the switch, the wiring connections and the automatic action mechanism are protected both from the soiling effects incident to cooking operations and from accidents.

The invention consists of certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a front elevation of the cooker with an oven applied to its top and having its extensible combined waffle-iron and hot plate in laterally extended position. Figure 2 is a detail edge and sectional view of the supplemental bottom part of the extension waffle-iron. Figure 3 is a plan of the hinge device connecting the extension iron and the top plate of the cooking stove. Figure 4 is a perspective of a cooking or drip pan. Figure 5 is a perspective of a toasting basket, and Figure 6 is a detail section thereof.

Figure 9 is a bottom plan of the stove and an applied waffle-iron, and Figure 10 is a vertical, longitudinal section of the stove; its doors being open.

Figure 11 is a perspective of the insulation block of the the wiring system.

Figure 12 is a perspective of the heating element assembly and its supporting rack (detached from the stove).

Figure 13 is a cross-section of a heating element of the present invention.

Figure 14 is a diagram of the heating elements as connected to a standard "3 heat heater switch."

Figure 7:
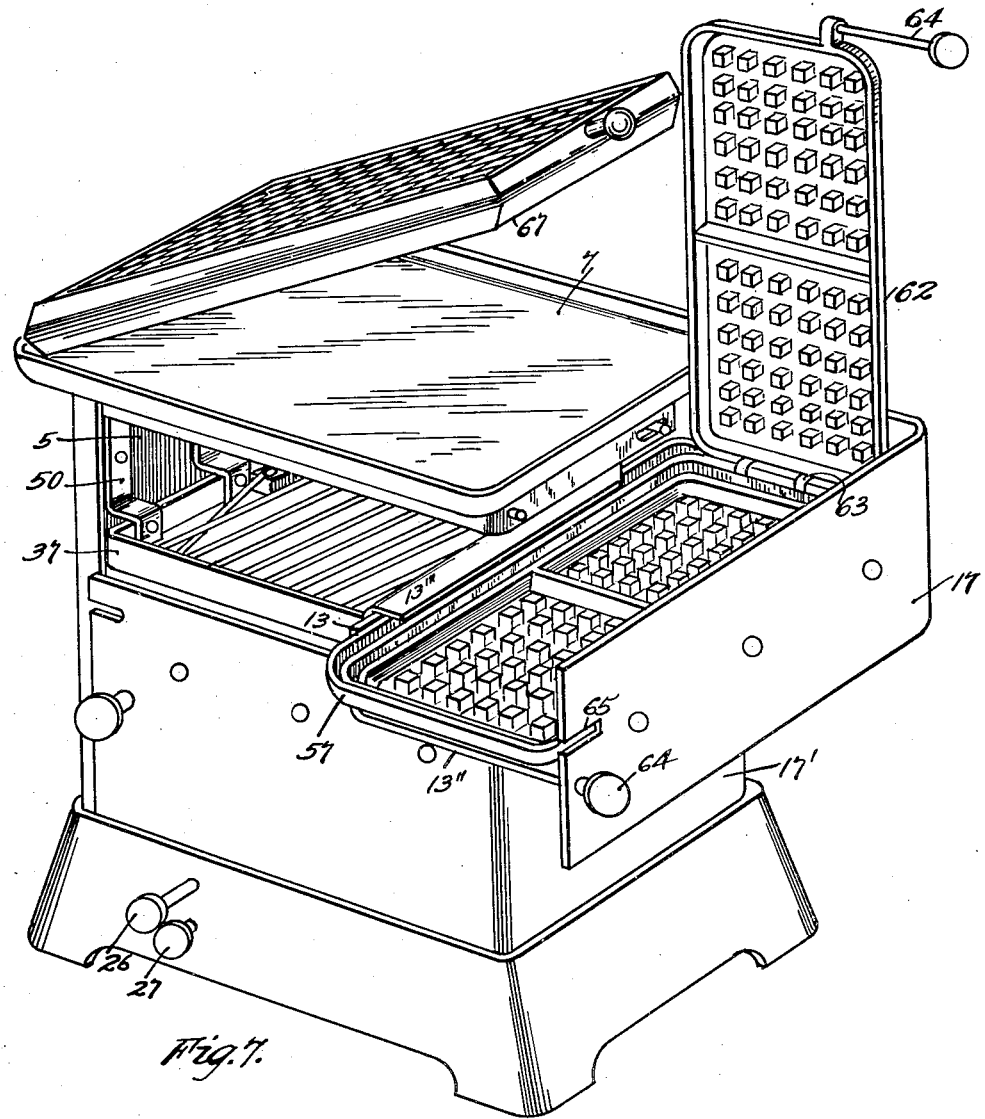
Figure 7 is a perspective of the cooker showing the extension waffle-iron as partly lowered to the top plate of the stove and showing a front door of the stove as opened and carrying a waffle-iron whose top is raised; a lower door of the stove being shown closed.

The stove has a substantial, hollow base flange 2 of rectangular form provided with a dished top 3 on whose rim margin 4 there stands a side wall panel 5 connected at its rear end to a back wall panel 6; thus forming an L-shaped wall. A top, hot plate 7 is securely fastened by bolts 8 to the base and serves to hold the wall in place. At the vertical end of the back 6 is disposed a vertical shaft 9 with an upper bearing 10 in the top plate 7 and a bottom bearing 11 on the base rim 4.

Fixed on the upper part of the shaft 9 is a hub 12 disposed at an inner corner of a U-shaped bracket-frame 13; one of which is shown in plan in Fig. 9, on an open door (later described). The bracket includes a pair of parallel side rails 14 of angle section and presenting ledge flanges 15—16, Fig. 8, to receive and support various, inserted cooking utensils as afforded by this invention. To the outer side and the back of the bracket 13 there is secured an upper door which includes a front panel and an end panel forming an L-shaped door body 17 complementary to the size and form of the stove wall 5—6 and forming therewith a rectangular stove chamber.

The shaft 9 extends through the base rim and has fixed on its end a straight arm 18 to which is connected a spring 18 exerting a pull tending to swing the door 17 to an open position.

Also passing through the lower bearing 11 is a hollow shaft 20 mounted on the shaft 9 and having fixed on its lower end a straight arm 21, below the base top 3. Secured to the upper part of the hollow shaft 20 is a hub 12' of a bracket frame 13' similar to the frame 13 just above and having attached to it a door 17' similar to door 17 and operating just below it; the two doors cooperating to fully close the front and right hand side of the stove. A spring 19' attached to the arm 21 tends to open the door 17'.

Means are provided to control and time the automatic opening action of the stove doors and, as here shown, include well known electric time switches, one for each door. Each switch includes a clock work W which is wound by pressing inward a stem 22 attached to a lever 23 whose winding stroke causes a tappet arm 24 to be thrown to a cocked position c, Fig. 9, and when pulled outward the lever 23 acts to release the wound clock work so that according to the lapsed time desired the tappet will be released and the opening of the relative door effected. The released tappet strikes the adjacent arm 25 of a spring actuated latch whose heel 25' engages the nearby end of the relative door arm (18—21) when its door is closed. A released tappet and its latch is indicated at r, Fig. 9. At the front of the base 2 a set of knobs 26—27 are provided for the respective stems 22 of the several clock works.

Means are provided to effect the manual release of the doors at will from control of the clock control. The manual release means as here shown includes a pair of shafts 29 having cranks 30 arranged to engage the latch arms 25, when hand levers 31 on the outer ends of the shafts are manipulated to effect the release at will.

Projecting through the left hand side flange of the base 2 is a multiple-heat control switch S from which extend service wires 32 which attach to the lower ends of a set of binding posts 33 mounted in an insulator 34 secured in an aperture therefor in the rim of the base bed or top 3. Circuit wires 35 lead from the upper ends of the binding posts 33 to a system of electric-resistance heating units 36, which are of like structure as described below.

Each unit, or heater element, includes a rectangular frame 37 within the side bars of which are disposed longitudinal shafts 38 hung in the ends of the frame and each carrying one or more tubular insulators 39 preferably having peripheral grooves 40 evenly spaced along the tubes; these being free to turn on their shafts. One or the other of the shafts 38 is permitted to float back and forth in the ends of the frame as in grooves 41, Fig. 12. Extending rearward from the floating shaft is a set of screw rods 42 having nuts 43 on their outer ends whereby the reaction of interposed expansion springs (or equivalent means) 44 may be regulated to pull back the shaft 38 near the rear of the frame. On each end of the tensioned shaft 38 there is loosely hung a forwardly extending insulator block 45 and a suitable type of resistance filament or wire 46 is rove from one insulator 45 to the opposite tube 39 at the front of the frame 37 and thence back and forth over the grooved parts of the tubes at each side of the frame and finally attached to the remote block 45 at the far end of the frame. The terminals of the filament are secured by screws 47 to which respective circuit wires 33 are attached. The purpose of this specific type of heating element is to greatly increase the useful life of the somewhat fine filament of the unit by reducing the tendency of the oxidized filament to crystallize because of repeated buckling due to expansion and contraction resultant from heating and cooling; the buckling occurring near the terminals in the forms of heater elements now in general use. By use of the floating insulator as here disclosed the wire can stretch and contract freely but will at all times be kept taut and buckling will be precluded.

A feature of the heating system is the assembly of a plurality of the heating elements or units 36 in vertically spaced order and horizontal position so that a cooking utensil may be placed on the door brackets and then swung into cooking position where the goods to be cooked will be exposed to superjacent and subjacent heat radiation from a pair of vertically spaced elements. The vertical series of elements 36 is rigidly attached at the left hand end to a pair of vertical posts 50 and to a back post 51 and these posts are removably screwed to the adjacent left hand side of the fixed wall 5—6. Thus the heater element group can be readily mounted and dismounted as a unit, when necessary.

Referring again to the door brackets 13—13' these are open at their front ends and each has a dropped front tie bar 13" firmly connecting the front ends. The angle-sides of the brackets have overhanging top flange lips 13''' which serve as guards to prevent upward movement of inserted utensils.

In Fig. 4 is shown a shallow, wide flanged pan 52 which may be slipped onto one of the brackets of the doors and by this swung into cooking position between upper and lower heating elements.

Fig. 5 illustrates a toast bread basket 53 with side wire bars 54 forming ledges to rest on the flanges of the door brackets.

In Fig. 10 a sheet of asbestos 55 rests on the dished base top 3 and a removable drip tray 56 on the asbestos protects it and facilitates cleaning from time to time.

Figure 8:
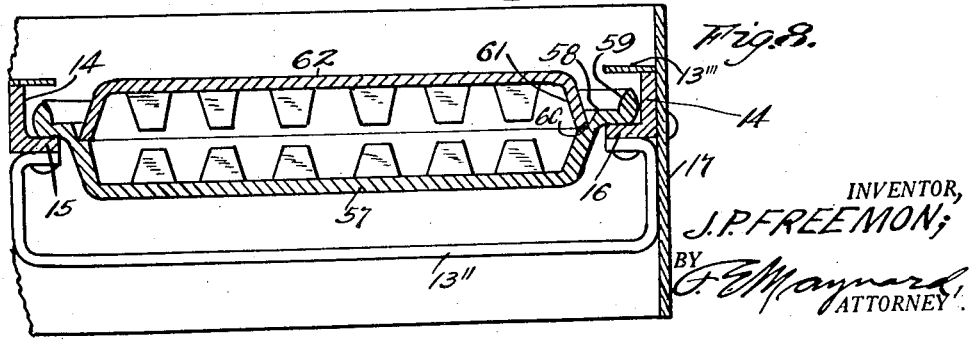
Figure 8 is a transverse section of a closed waffle-iron placed on brackets therefor on a stove door.

In Figs. 7 and 8 is shown a lower, waffle-iron part 57 with side flanges 58 to rest on the door bracket and having a vertical rim bead 59 to prevent overflow of batter from the iron. The flanges 58 are recessed at 60 to match the complementary rim 61 of an upper section 62 of the waffle iron; the sections 57—62 being hinged together at their rear ends, at 63. The upper section of the waffle iron is of such width that it may be swung upward between the guard lips 13''' of a bracket when the door is in open position as shown in Fig. 7. The section 62 of the iron has a handle 64 at its front end by which it may be swung up to uncover the lower iron, and a slot 65 is provided in each door 17—17' to receive the handle as the waffle iron is pushed fully onto its bracket and allow the full closing of the door at the front of the cooker.

Various cooking operations may be performed on the top, hot plate 7, and when desired an oven box 66 may be utilized on the plate.

The cooking capacity of the stove is greatly increased by means of a heater element encased in a supplementary hot plate 67 which has a trunnion 68 journaled in a hinge block 69 whose pivot 70 is in the plane of and transverse to the axis of the trunnion 68. This compound hinge includes a bracket 71 attached to the side of the top plate 7 and allows the plate 67 to be folded over the plate 7 when desired. One side of the plate 67 is formed with a waffle-iron section 72 to match with a complementary iron section 73 when the latter is placed on the stove plate 7, and in such use the plate 67 is turned on its axis of trunnion 68 so as to present the waffle-iron section down toward the section 73 on the stove. The hinge block device 69 has pins 74 vertically slidable in the bracket 71 compensating for change of level of the waffle iron 72.

In operation, if food holding utensils are placed on the carrying doors and loaded with food to be cooked then the winding stem knobs 26—27, or either of them, of the respective doors 17—17' are pressed inward to wind the clocks and to allow the spring actuated latch levers 25' to come into position to interlock with the respective door arms 21—18. Then as the doors are closed the arms are caught by their latches and held against the opening effort of their springs 19—19'. When it is desired to commence cooking of the food on the closed carriers the knobs, or knob, are pulled out to release the clocks for operation and at the end of the run the tappets 28 will (independently) snap over and strike the relative door latch and release its engaged door arm 21—18. The released door swings open to a position where the cooked food is carried away from the ascending heat from the heater elements in the stove: thus over-cooking is avoided.

One push of the clock stem winds the clock for a minimum cooking period, as thirty seconds, and the periods may be increased in multiples of this unit by merely repeating the stem pushes correspondingly to energize the clock for the increased run.

To materially economize in current consumption a circuit closer blade 75 is connected in the main feeder 76 and moved to close the circuit by either of the door arms 21—18, or other suitable part, when the doors, or either of them, are closed; the circuit automatically breaking at the blade contact when both doors are open.

The heating filament of a heating element is practically exposed throughout its length for effective radiation of infra-red rays directly to the food being cooked with high heating efficiency and a material saving in current consumption over types of heaters where the filaments are considerably encased in a bed of insulation.

What is claimed is:

1. A cooker having an electric heating element and a casing therefor having an open front and an open side and a cooking utensil holder connected by a vertical hinge at the rear wall of the casing for relative separation so that cooked food on the holder is held in a position clear of the heat column rising from the hot element, and means to effect the separating action; the holder forming a closure for the open sides of the casing.

2. A cooker having an electric heating element and a casing therefor, and a cooking utensil holder which are connected for relative separation so that cooked food on the holder may be held in a position removed from the vertical confines above the heating element, and means to effect the relative separation of the element and the holder; said holder including a movable front and side wall closure for the casing.

3. A cooker having a horizontally disposed, rectangular heating element, and a cooking utensil holder hingedly connected to a rear corner of the element for horizontal relative motion and operating to carry cooked food laterally away from the said element to a position across one end thereof, and a rectangular casing of which said holder includes a front and an end closure.

4. A cooker having a horizontally disposed heating element, and a cooking utensil holder connected to the element for horizontal swinging movement to carry cooked food laterally from the element, control means for securing the holder in cooking position as to the element, and means for automatically moving the holder from cooking position when released by the control means; the latter including a time device; said holder fixed to a vertical pivot having a fixed arm engaged by said control means.

5. A cooker having a heating element, a cooking utensil holder operatively connected by a vertical pivot member to the said element to horizontally swing cooked food laterally from the element, a time control means engaging a part fixed on said pivot for securing the holder in cooking position at the element, means connected to the pivot for automatically moving the holder from cooking position when released by the control, and manual means for releasing the holder from the time control.

6. An electric cooker having a plurality of horizontal, vertically spaced heating elements and a casing therefor, and food holding means connected to the elements for horizontal movement to and from a position between said elements and including front and side wall parts for the casing.

7. An electric cooker having a plurality of horizontal, vertically spaced heating elements, and food holding means hinged to the elements for horizontal movement to and from a position between said elements; said means including a plurality of separately operative food holders swinging on a common vertical axis.

8. An electric cooker having a plurality of vertically spaced heating elements forming vertically different pairs, and a plurality of horizontally swinging, independent food holders one for each pair connected to the said elements and separately interposable between a pair of the spaced elements.

9. An electric cooker having a plurality of horizontal, vertically spaced, rectangular heating elements forming vertically different pairs, and a plurality of horizontally movable swinging, independent, food holders one for each pair which conform in plan and size to the said elements and are operatively attached thereto.

10. An electric cooker having a base, a casing wall fixed on the base, a top plate fixed on the wall, a plurality of horizontal, vertically spaced heating elements fixed in the case, and a wall-forming door device operatively connected to the case and provided with a food carrier; whereby food to be cooked is movable to a position between said elements.

11. An electric cooker having a wall which is L-shape in plan, and a door device of corresponding L-shape plan and one end of which is connected to a contiguous end of the wall whereby to form a rectangular closed casing, and food carriers on the door device movable by the open device to a position clear of an end of the case to facilitate loading and unloading.

12. An electric cooker having a wall forming one side and the back of a casing, and a door including panels forming one side and the front of the casing; the end panel of the door being hinged to the end of the back wall part.

13. An electric cooker having a wall forming a back and one side wall of a casing, and a door device connected to the casing and forming the other side and the front thereof, and including vertically coordinate sections each having a food carrying means and being separately operative.

14. An electric cooker having a series of vertically spaced heating elements, a fixed wall forming a back and one side of a case for the elements, vertically coordinate door sections forming the other side and the front of the case for the elements and each section provided with food carrying means interposable between a pair of immediately adjacent heating elements in the case.

15. In a cooker of the class described; a food carrier movable to and from cooking position, means to automatically move the carrier from cooking position, means to latch the carrier in cooking position, and a time control means of the push-wind, pull starter type for automatically releasing the latch means.

16. In a cooker of the class described; a food carrier movable to cooking position, means to automatically move the carrier from cooking position, means to latch the carrier in cooking position, time control means for automatically releasing the latch means, and manual means to trip the latch means independently of the time means.

17. In a cooker of the class described; a food carrier fixed to a vertical pivot, means to automatically move the carrier from cooking position, a spring latch, means fixed to the pivot of the carrier to engage the latch and hold the carrier in cooking position, and a time control device including a tappet to trip the latch to release the carrier for automatic movement from cooking position.

18. In a cooker of the class described; a horizontally swinging food carrier having parallel bracket flanges, a rectangular cooking utensil having side parts slidable into position of rest on the said flanges, and vertically spaced rectangular heating elements between which the mounted utensil may be moved by the carrier and of about coextensive area with the utensil.

19. A cooker of the class described having a hollow base including a full top closing the chamber of the base, a heating unit system fixed on the base top and wholly separated thereby from the chamber, a cooking casing mounted on the said top and forming a compartment wholly separate from the base chamber, closure door means for the casing, means in the base for opening the door means and means automatically controlling the opening means and concealed within the base.

JOHN P. FREEMON.